United States Patent [19]

Yamashita et al.

[11] Patent Number: 4,620,987

[45] Date of Patent: Nov. 4, 1986

[54] SURFACE TREATMENT METHOD FOR MAGNETIC PARTICLES

[75] Inventors: Hiroshi Yamashita, Numazu; Kenkichi Muto, Yokohama, both of Japan

[73] Assignee: Ricoh Company, Ltd., Tokyo, Japan

[21] Appl. No.: 614,407

[22] Filed: May 25, 1984

[30] Foreign Application Priority Data

Jun. 3, 1983 [JP] Japan ................................. 58-97926

[51] Int. Cl.⁴ ............................................ B05D 5/12
[52] U.S. Cl. ................................. 427/131; 427/214; 427/215; 427/216; 427/221; 427/302; 427/314; 427/318; 427/379; 427/385.5; 427/388.1; 427/399; 427/407.1; 427/409
[58] Field of Search ............... 427/214, 131, 302, 318, 427/409, 314, 379, 215, 385.5, 216, 221, 388.1, 269, 407.1; 430/137

[56] References Cited

U.S. PATENT DOCUMENTS

| | | | |
|---|---|---|---|
| 2,876,133 | 3/1959 | Iler et al. | 427/214 |
| 3,505,100 | 4/1970 | Vanderbilt et al. | 427/214 |
| 3,837,892 | 9/1974 | Marzacchi | 427/214 |
| 4,264,700 | 4/1981 | Bayley | 430/137 |
| 4,314,931 | 2/1982 | Hoffend | 430/137 |

FOREIGN PATENT DOCUMENTS

| | | | |
|---|---|---|---|
| 0121050 | 9/1981 | Japan | 430/137 |
| 0168254 | 10/1982 | Japan | 430/137 |
| 0007648 | 1/1983 | Japan | 430/137 |
| 0007646 | 1/1983 | Japan | 430/137 |
| 0158650 | 9/1983 | Japan | 430/137 |

*Primary Examiner*—John D. Smith
*Assistant Examiner*—Janyce A. Bell
*Attorney, Agent, or Firm*—Flynn, Thiel, Boutell & Tanis

[57] ABSTRACT

A surface treatment method for magnetic particles is disclosed, which comprises the steps of activating magnetic particles by application of heat thereto, treating the surface of the magnetic particles with a reactive silane coupling agent, bringing the treated magnetic particles into contact with at least one polymerizable vinyl-type monomer, polymerizing the monomer to form a polymer, and coating the surface of the magnetic particles with the polymer.

8 Claims, 1 Drawing Figure

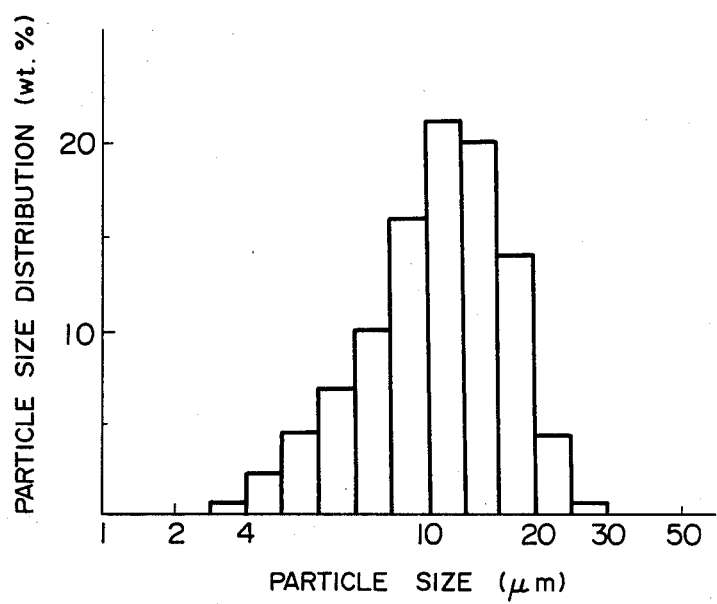

SURFACE TREATMENT METHOD FOR MAGNETIC PARTICLES

BACKGROUND OF THE INVENTION

The present invention relates to a method of treating the surface of magnetic particles in order that the magnetic particles are well dispersed in polymerizable monomers or in polymers when mixed therewith.

In manufacturing magnetic recording materials, magnetic rubber, magnetic plastics and the like, it is required that the magnetic particles to be contained in those materials have surface having affinity for polymerizable monomers, polymers and oily materials in order that the magnetic powder particles can be well dispersed in them. In particular, when toner for use in the developing of latent electrostatic image is prepared, it is one of the essential requirements that the magnetic powder particles have the above-mentioned affinity.

As dry-type developers containing as the main components a coloring agent and a resin for developing latent electrostatic images in electrophotography, electrostatic recording and electrostatic printing, the following developers are conventionally known:

(1) Two-component type developer which is prepared by mixing dry-type toner with carrier particles with a particle size larger than the particle size of the toner particles, thereby triboelectrically charging the toner particles to a polarity opposite to the polarity of latent electrostatic images to be developed. Development by this two-component type developer of the latent electrostatic images is performed by bringing the developer into contact with the latent electrostatic images.

(2) One-component type developer consisting essentially of a toner with relatively low electric resistance or high electric resistance, containing a magnetic material therein. Development of latent electrostatic images by this developer is performed by bringing the developer into contact with or bringing the developer near latent electrostatic images.

Conventionally, when the above-mentioned toners are prepared, a thermoplastic resin is fused and a coloring agent such as a dye or a pigment, a magnetic material, a triboelectric charging control agent, an offset preventing agent, and a lubricating agent are added to the fused thermoplastic resin, and the mixture is well mixed. The mixture is then cooled until it becomes hardened. The hardened mixture is then crushed and pulverized, so that particles with the desired particle sizes are obtained by classification.

However, this method has the following shortcomings:

First, this method requires, for example, a polymerization apparatus for producing the above-mentioned resin, a mixing and kneading apparatus, a crusher or pulverizer and a classifier. Furthermore, due to the use of these apparatus, energy consumption is so great that the cost for the production of the toner is high.

Second, the conditions for uniformly dispersing the above-mentioned components are so delicate that it is extremely difficult to obtain a uniform mixture or dispersion of these components.

Third, in the course of the crushing or pulverizing process in this method, particles with a wide range of particle sizes are obtained. Therefore, a classification process is indispensable. Accordingly, the yield of the particles with the desired particle sizes is relatively low.

Fourth, the obtained particles are so irregular in shape that the fluidity of the particles is poor. Further, since repulverizing of the particles takes place when they are stirred for triboelectric charging, finer particles are produced in the course of the repulverizing and the fogging of the developed images is brought about by those finer particles.

In contrast to this, in Japanese Patent Publication No. 36-10231, Japanese Patent Publication No. 43-10799, Japanese Patent Publication No. 47-51830, Japanese Patent Publication No. 41-14895, U.S. Pat. Nos. 4,264,700 and 4,314,931, there are described methods for producing toner by emulsion polymerization and by suspension polymerization. In these polymerization methods, kneading and crushing processes are unnecessary, and starting materials for producing the toner by these methods are less expensive as compared with polymers employed in conventional methods. Furthermore, since the particles of the toner obtained by these methods are spherical, the fluidity of the toner is much better than that of the toner obtained in the conventional methods. Moreover, the apparatus necessary for these methods is simpler than the apparatuses in the previously mentioned conventional method. Specifically, only one reaction chamber is necessary for the main reaction. The required energy for these methods is much less than the energy as required for fusing, cooling, crushing and classification in the previously mentioned method.

The suspension polymerization method, however, has the shortcoming that, depending upon the degree of the affinity for the magnetic particles of additives added to the resin and of the resin, it may occur that the magnetic particles diffuse from the suspended particles into the aqueous phase or the magnetic particles are not dispersed uniformly within the resin particles. If this takes place, the produced toner cannot fully perform its function.

More specifically, in the suspension polymerization for preparing a one-component type magnetic developer or magnetic toner, a large amount of magnetic powder is dispersed in a polymerizable monomer and the dispersion is suspended in an aqueous dispersion medium with high speed stirring, thereby forming liquid particles containing magnetic particles therein, with almost the same size as the toner particles employed in practice. However, in the course of this dispersing, it takes places that the magnetic particles aggregate at the surface of the liquid particles, the magnetic particles diffuse into the aqueous dispersion medium, or after the polymerization of the liquid particles, the formed toner particles are contaminated by free magnetic particles or the magnetic particles are deposited on the surface of the toner particles, so that the electric conductivity of the toner increases or the surface resistance thereof decreases. As a result, the charging performance of the toner particles is impaired and occasionally image transfer becomes impossible.

In order to improve the dispersion performance of the magnetic particles, it has been proposed to treat the surface of the magnetic particles so as to have an affinity for oils or oily materials. For instance, in Japanese Laid-Open Patent Application No. 57-81271, there is disclosed a method of using magnetic particles together with a titanate coupling agent. In Japanese Laid-Open Patent Application No. 54-84731, there is disclosed a method of treating the surface of magnetic particles with a silane coupling agent in an attempt of preventing the magnetic particles from diffusing into the aqueous phase in the above-mentioned dispersion.

By the above proposed methods, the magnetic particles can be successfully prevented from diffusing into the aqueous phase when dispersing in the aqueous phase a polymerizable monomer containing the magnetic particles therein. However, by these methods it cannot be prevented that the toner particles are exposed at the surface of the toner particles or the magnetic particles are distributed unevenly within the toner particles.

When the above phenomena take place, the surface electric resistance of the toner particles so decreases that it becomes impossible to electrically charge the toner particles and the preservability and resistance to high humidity of the toner are significantly impaired, and the toner particles aggregate, with the result that the fluidity of the toner particles becomes poor.

When the dispersion of the magnetic particles is poor, the liquid particles in the course of suspension polymerization easily collapse. As a result, the apparatus for the suspension polymerization reaction is polluted with the magnetic particles and the advantages of the suspension polymerization are not available.

SUMMARY OF THE INVENTION

It is therefore an object of the present invention to provide a surface treatment method for magnetic particles so as to have an affinity for oils and oily materials including polymeric materials, by which method a toner for developing latent electrostatic images can be provided with each toner particle being spherical in shape and the magnetic particles being covered with a resin and distributed uniformly in each toner particle.

BRIEF DESCRIPTION OF THE DRAWING

In the drawing, the single figure shows a graph indicating the particle size distribution of a toner prepared in Example 3 by use of the surface treatment method according to the present invention.

DETAILED DESCRIPTION OF PREFERRED EMBODIMENTS

A surface treatment method for magnetic particles according to the present invention comprises the steps of activating magnetic powder by application of heat thereto, treating the surface of the magnetic particles with a reactive silane coupling agent, bringing the silane-treated magnetic particles into contact with a vinyl-type monomer which can be polymerized by radical polymerization or radical copolymerization, polymerizing the vinyl-type monomer to form a polymer, and coating the surface of the magnetic particles with the polymer.

The present invention will now be explained more specifically by referring to an example in which a dry type toner for developing latent electrostatic images was prepared by use of the surface treatment method for magnetic particles according to the present invention.

In this example, as the magnetic particles, there can be employed metals such as iron and nickel, alloys of those metals and other metals, metal oxides such as iron oxide and nickel oxide, and ferro-magnetic materials such as ferrite. It is preferable that the particle size of the magnetic particles be in the range of 0.01 $\mu$m to 1 $\mu$m, more preferably in the range of 0.1 $\mu$m to 0.5 $\mu$m.

Further, it is preferable that the magnetic particles with the particle sizes in the above-mentioned particle size ranges be contained in the toner in an amount ranging from 20 wt. % to 80 wt. %, more preferably in the range of 35 wt. % to 65 wt. %, with respect to the entire weight of the polymerized toner.

In the preparation of this toner, it is preferable that prior to the surface treatment by a reactive silane coupling agent, the magnetic particles be heated at temperatures ranging from 100° C. to 500° C. to remove adsorbed water therefrom, thereby activating the magnetic particles.

Usually the reactive silane coupling agent is directly applied to the surface of the magnetic particles. Alternatively the reactive silane coupling agent can be added to the monomer at the time of the polymerization.

In this surface treatment process, the silane coupling agent is added to a mixture of water and alcohol or to other appropriate organic solvent in an amount of 0.1 wt. % to 5 wt. %, more preferably in an amount of 0.5 wt. % to 2 wt. %, with respect to the amount of the magnetic particles to be treated. The pH of the solution of the silane coupling agent and the solvent is adjusted to be at such a pH at which the silane coupling agent is hydrolyzed. The magnetic powder is then immersed in the solution and is filtered off or the solution is removed by evaporation, followed by drying the magnetic particles by subjecting them to, for instance, super drying. Thereafter the magnetic particles are subjected to heat treatment at 100° C. to 120° C., whereby the bonding of the silane coupling agent to the surface of the magnetic particles is fortified.

Next, the thus treated magnetic particles are coated with a polymer. For coating the magnetic particles with a polymer, the following methods can be employed:

(1) coating by vapor-phase polymerization of a polymerizable monomer in the presence of the magnetic particles (2) coating by polymerizing a monomer in an appropriate solvent in the presence of the magnetic particles (3) coating by bulk polymerization of a monomer in the presence of the magnetic particles.

Of the above-mentioned three methods, the third method is the most economical and the most preferable. As the polymerizable monomers employed in the above methods, any monomers can be employed if they can be polymerized by radical polymerization. In other words, they can be the same as or different from a polymerizable monomer for preparing a thermoplastic resin employed in the toner.

As the polymerization initiators for the above-mentioned polymerization, water-soluble radical generating agents and oil-soluble radical generating agents can be employed, depending upon the types of the polymerization methods and monomers employed.

In the polymer-coated magnetic particles obtained by use of the surface treatment method according to the present invention, the magnetic particles are not simply covered by the polymer, but it appears that the reactive silane reacts with the polymer, so that the polymer is firmly bonded to the surface magnetic particles.

A method of preparing a toner by suspension polymerization by use of the above described polymer-coated magnetic particles will now be explained.

To one or more polymerizable monomers which serve as the starting materials of a thermoplastic resin, there are added the polymer-coated magnetic particles, a pigment, a dye, and if necessary an offset prevention agent such as polyolefin, an oligomer or a prepolymer. The mixture is subjected to stirring, shaking, and dispersing by use of ultrasonic wave, a ball mill or a sand mill, whereby a uniformly colored polymerizable monomer mixture is prepared. In this mixture, there is dissolved an oil-soluble radical polymerization initiator, preferably in an amount of 0.05 mole % to 3 mole %, more preferably in an amount of 0.3 mole % to 1 mole % with respect to the entire moles of the polymerizable monomer.

Apart from the above, in an aqueous dispersion medium, there is dissolved a suspension stabilizing agent such as a water-soluble polymeric material or a surface active agent, preferably in an amount of 0.1 wt. % to 5 wt. %, more preferably in an amount of 0.5 wt. % to 3 wt. %. If necessary, a small amount of an aqueous phase polymerization inhibitor is added to the above solution.

The previously mentioned polymerizable monomer mixture is added to the above aqueous dispersion medium, with stirring at high speed, preferably in an amount of 5 wt. % to 200 wt. %, preferably 20 wt. % to 100 wt. %, with respect to the aqueous dispersion medium, whereby the polymerizable monomer mixture is suspended in a stable manner in the form of divided liquid particles with a particle size ranging from 5 μm to 20 μm, containing the polymer-coated magnetic particles therein.

For this high speed stirring, a homomixer and a homogenizer are preferably used, since they can divide the liquid particles by the minute gap between a fixed portion and a rotating portion of those mixing apparatus. The stirring time is preferably in the range of 10 seconds to 10 minutes, more preferably in the range of 30 seconds to 3 minutes. With respect to the rotation speed for the stirring, it is preferable that the rotation speed be in the range of 1,000 rpm to 20,000 rpm, more preferably in the range of 3,000 rpm to 10,000 rpm.

The thus obtained suspension is placed in a flask equipped with a stirrer, a thermometer, an inert gas leading tube and a reflux condenser. The suspension is subjected to polymerization with slow stirring of about 500 rpm to 2,000 rpm under the atmosphere of an inert gas at temperatures ranging from 40° C. to 100° C., more preferable in the range of 50° C. to 80° C.

After the polymerization, the product is washed with water and dried by use of conventional methods, such as air-drying, spray drying and vacuum drying, whereby a toner is prepared.

Specific examples of the surface treatment agents and additives for preparing the above toner are as follows:

Silane coupling agents (The following are commercially available.):
γ-chloropropyltrimethoxysilane,
vinyltrichlorosilane,
vinyltriethoxysilane,
vinyltrimethoxysilane,
vinyltris(β-methoxyethoxy)silane,
γ-methacryloxypropyltrimethoxysilane,
β-(3,4-epoxycyclohexyl)ethyltrimethoxysilane,
γ-glycidoxypropyltrimethoxysilane,
γ-mercaptopropyltrimethoxysilane,
γ-aminopropyltriethoxysilane,
N-β-(aminoethyl)-γ-aminopropyltrimethoxysilane, and
γ-ureidopropyltriethoxysilane.

Polymerizable monomers for use in the polymer coating of the magnetic particles and in suspension polymerization (Any polymerizable monomers can be employed. However, the following are particularly preferable for use):

styrene, styrene derivatives such as α-methyl styrene and and p-chlorostyrene, alkyl methacrylate such as methyl methacrylate, ethyl methacrylate, butyl methacrylate, hexyl methacrylate and 2-ethylhexyl methacrylate, ethylenic unsaturated monoolefins such as ethylene, propylene, butylene and isobutylene, halogenated vinyls such as vinylchloride, vinylbromide and vinyl fluoride, and vinyl derivatives such as vinyl ethyl ether, vinyl methyl ketone and N-vinylcarbazole.

In addition to the above, divinyl compounds such as divinylbenzene, ethylene glycol dialkylate and trimethylolpropane triacrylate can be employed as cross-linking agents for the above monomers in an amount of 0.005 wt. % to 20 wt. % with respect to the vinyl derivatives.

Polymerization initiators:

Azo compounds such as 2,2'-azobisisobutyronitrile, 2,2'-azobis(2,4-dimethylvaleronitrile), peroxides such as benzoyl peroxide and lauroyl peroxide, which can be employed as oil soluble radical generating agents. In order to hold the molecular weight of the polymer within a predetermined range, a chain transfer agent such as dodecylmercaptan and carbon tetrachloride can also be employed.

Coloring Agents:

Pigments such as carbon black, cyanine and quinacridone, and water-insoluble dyes such as Aniline Black, Nigrosine. These dyes can also be used as a charge controlling agents of the toner.

Polymers, Oligomers and Prepolymers:

The following can be employed for offset prevention in image transfer, and for improvement of the fluidity and image fixing properties of the toner: polyethylene, polypropylene, vinyl acetate ethylene copolymer, halogenated polyethylene, wax, polyamide, polyester, polyurethane, polyvinylbutyral, butadiene-type rubber, phenolic resin, epoxy resin, rosin-modified resin, silicone oil and silicone wax.

In order to stabilize the divided liquid particles in the suspension, the following can be employed in the aqueous dispersion medium: water-soluble polymeric materials such as polyvinyl alcohol, gelatin, methyl cellulose, methylhydroxypropyl cellulose, ethyl cellulose, sodium salt of carboxylmethylcellulose, polyacrylic acid and salts thereof; surface active agents such as sodium dodecylbenzenesulfonate; and slightly water-soluble inorganic compounds such as silica, alumina, talc, calcium carbonate, calcium phosphate, barium sulfate and bentonite.

As the water-soluble polymeric material, polyvinyl alcohol with a saponification degree of 70% to 95% and with a polymerization degree of 500 to 3,000 is particularly useful. It is preferable that the polyvinyl alcohol be employed in an amount of 0.1 wt. % to 5 wt. %, more preferably in an amount of 0.5 wt. % to 3 wt. % in an aqueous dispersion medium.

The magnetic toner particles prepared by use of the surface treatment method according to the present invention are essentially in the shape of a complete sphere, and well dispersed in the resin of the toner, and the range of the particle size distribution is narrow. Therefore, the fluidity of the toner particles is excellent. Accordingly the aggregation of the toner particles is significantly decreased as compared with other conventional toner particles. This excellent fluidity of the toner particles and the decreased aggregation properties thereof can be further improved by the addition thereto of a hydrophobic fatty acid metal salt such as zinc stearate, hydrophobic silica powder, or other small particles with a low coefficient of friction.

As mentioned above, the magnetic toner that can be obtained by use of the surface treatment method according to the present invention is suitable for use as a one-component type developer. However, this surface treatment method can also employed for preparing a two-component type developer comprising toner particles and carrier particles.

Furthermore, the reactive-silane-treated and polymer-coated magnetic particles can be well employed in a method of producing toner particles including the processes of fusing, kneading and crushing, so that toner with high dispersibility, high preservability and high resistance to high humidities can be obtained.

By referring to the following examples, the application of the present invention to the preparation of magnetic toner particles will now be explained in more detail.

EXAMPLE 1

(1) Heat Treatment and Silane Treatment of Magnetic Particles 100 parts by weight of tri-iron tetroxide powder (Trade Mark: EPT-100 made by Toda Kogyo Corp.) was subjected to heat treatment at 300° C. for 4 hours and was then added to a mixture of the following components:

|  | Parts by Weight |
| --- | --- |
| Y-methacryloxytrimethoxysilane | 2 |
| Methyl alcohol | 45 |
| Water | 5 |

The above mixture was mixed for 1 hour, whereby the tri-iron tetroxide powder was sufficiently immersed in the silane solution. The mixture was then air-dried so as to remove the solvent therefrom. The residue was then subjected to heat treatment at 110° C. to 120° C. for 1 hour, whereby magnetic particles treated with the silane coupling agent were obtained.

The thus silane-treated magnetic particles measured 101.2 parts by weight, indicating that 1.2 parts by weight of the silane was deposited on the surface of the magnetic particles.

(2) Polymer Coating of the Silane-treated Magnetic Particles

A mixture of the following components was placed in a flask equipped with a stirrer, a reflux condenser, an argon gas leading tube and a thermometer, with the atmosphere in the flask replaced with an argon gas which was dried in advance by bubbling it through concentrated sulfuric acid:

|  | Parts by Weight |
| --- | --- |
| The above silane-treated magnetic particles | 100 |
| Styrene monomer | 35 |
| n-Butylmethacrylate monomer | 15 |
| 2,2'-Azobisisobutyronitrile | 0.14 |

With a small amount of the argon gas constantly passing through the flask, the above mixture was polymerized at 75° C. to 80° C. for 1.5 hours. As the polymerization reaction proceeded, the mixture became uniform and a glossy, black and viscous dispersion of polymer-coated magnetic particles was formed.

(3) Preparation of a Monomer Mixture

Apart from the above above-described silane treatment and polymer coating processes, a monomer mixture was prepared by a grinding a mixture of the following components in a stainless ball mill for 20 hours:

|  | Parts by Weight |
| --- | --- |
| Styrene monomer | 35 |
| n-Butylmethacrylate | 15 |
| Nigrosine | 3.5 |
| Low-molecular-weight polypropylene | 10.5 |

A mixture of the following components was added to the dispersion of polymer-coated magnetic particles prepared in (2).

|  | Parts by Weight |
| --- | --- |
| The monomer mixture | 50 |
| 2,2'-azobis-(2,4-dimethylvaleronitrile) | 3.8 |

The above mixture was then stirred for 2 hours, whereby a dispersion of the magnetic particles and the monomer mixture was obtained:

(4) Preparation of a Suspension Containing the Magnetic Particles 400 parts by weight of an aqueous solution of a 3 wt. % polyvinyl alcohol with a saponification degree of 88% and with a polymerization degree of 2400 was prepared.

To this aqueous solution of the polyvinyl alcohol, there was added the dispersion of the magnetic particles and the monomer mixture prepared in (3). This mixture was dispersed by a commercially available mixer (Trade Mark: T. K. Homo Mixer made by Tokushu Kika Kogyo Co., Ltd.) at 4,000 rpm to 5,000 rpm for 30 seconds, whereby a suspension of divided liquid particles containing the magnetic particles therein was prepared. The particle size of the divided liquid particles was mostly in the range of 5 $\mu$m to 20 $\mu$m.

Those liquid particles were inspected by an optical microscope. The result was that no liquid particles allowed to transmit light therethrough and it was confirmed that the magnetic particles were uniformly dispersed within each liquid particle.

Furthermore, during the microscopic inspection, no liquid particles collapsed. When this suspension was allowed to stand for a while, the liquid particles were sedimented, but they were stable. One week later, it was found that those liquid particles did not collapse and were also stable. From these results, it was considered that each liquid particle was protected by the polyvinyl alcohol.

(5) Polymerization of the Suspension

The above prepared suspension was placed in a flask equipped with a stirrer, a reflux condenser, a thermometer, and an inert gas leading tube, and was subjected to suspension polymerization with a small amount of an argon gas being constantly passed therethrough, with stirring at 100 rpm, at 65° C. for 7 hours.

After the polymerization, the reaction mixture was cooled and was passed through a sieve with 200 meshes. As a result, no polymer residues remained on the sieve. Although it was found that only a small amount of a polymeric material adhered to the upper portion of a stirring rod of the stirrer, no polymeric material adhered to the blades of the stirrer.

(6) Separation of Magnetic Toner Particles

To the thus polymerized suspension, there was added 100 parts by weight of water. The mixture was stirred and the suspension was decanted. In this manner, the suspension was washed with water 3 times. Thereafter, the suspension was dried by air-drying and reduced pressure drying, whereby a magnetic toner No. 1 was obtained in a yield of 95%.

EXAMPLE 2

(1) Preparation of Polymer-coated Magnetic Particles

The same tri-iron tetroxide powder as that employed in Example 1 was subjected to the same surface treatment with the same silane coupling agent as in Example 1.

The polymer coating of the magnetic particles was also performed in the same manner as in Example 1, except that the obtained black and viscous dispersion of the polymer-coated magnetic particles was washed with toluene until, even though the toluene employed for the washing was added to methanol, no polymeric materials were separated from the alcohol, whereby excess styrene-n-butylmethacrylate copolymer was eliminated from the dispersion. Thus, copolymer-coated magnetic particles were prepared.

The weight ratio of the coated copolymer to the silane-treated magnetic particles was 1.8%.

(2) Preparation of a Monomer Mixture and a Dispersion of the Monomer Mixture and the Magnetic Particles A mixture of the following components was dispersed in a ball mill for 20 hours to prepare a monomer mixture:

|  | Parts by Weight |
| --- | --- |
| Styrene monomer | 70 |
| n-Butyl methacrylate monomer | 30 |
| Nigrosine | 2.4 |
| Low-molecular-weight polypropylene | 7.3 |

A mixture of the following components was dispersed with stirring by ultrasonic wave for 2 hours to prepare a dispersion of the monomer mixture and the magnetic particles:

|  | Parts by Weight |
| --- | --- |
| The monomer mixture | 100 |
| The copolymer-coated magnetic particles | 103 |
| 2,2'-azobis-(2,4-dimethylvaleronitrile) | 3.78 |

(3) Preparation of a Suspension Containing the Magnetic Particles 400 parts by weight of an aqueous solution of a 3 wt. % polyvinyl alcohol with a saponification degree of 88% and with a polymerization degree of 2,400 was prepared.

To this aqueous solution of the polyvinyl alcohol, there was added the dispersion of the magnetic particles and the monomer mixture prepared in (2). This mixture was dispersed by Homo Mixer at 4,000 rpm to 5,000 rpm for 30 seconds, whereby a suspension of divided liquid particles containing the magnetic particles therein was prepared. The particle size of the divided liquid particles was mostly in the range of 5 μm to 20 μm.

(4) Polymerization of the Suspension

The above prepared suspension was subjected to suspension polymerization as in Example 1.

(5) Separation of Magnetic Toner Particles

To the thus polymerized suspension, there was added 100 parts by weight of water. The mixture was stirred and the suspension was decanted. In this manner, the suspension was washed with water 3 times. Thereafter, the suspension was dried by air-drying and reduced-pressure drying, whereby a magnetic toner No. 2 was obtained in a yield of 94.5%.

The thus obtained magnetic particles were excellent in dispersion of the magnetic toner particles within the toner particles. No polymeric material adhered to the stirrer.

EXAMPLE 3

(1) Preparation of Silane-treated Magnetic Particles

Silane-treated magnetic particles were prepared in the same manner as in Example 1, except that as the reactive silane coupling agent, vinyl.tris($\beta$-methoxyethoxy)silane was employed instead of $\gamma$-methacryloxytrimethoxysilane.

(2) Preparation of Polymer-coated Magnetic Particles

A mixture of the following components was subjected to polymerization at 75° C. for 2 hours to prepare a dispersion of polystyrene-coated magnetic particles.

|  | Parts by Weight |
| --- | --- |
| The silane-treated magnetic particles | 100 |
| Benzene | 50 |
| Styrene monomer | 20 |
| 2,2'-azobisisobutyronitrile | 0.06 |

The thus obtained dispersion of the polystyrene-coated magnetic particles was washed with toluene as in Example 2, whereby polystyrene-coated magnetic particles were obtained. The weight ratio of the coated polystyrene to the silane-treated magnetic particles was 1.6%.

(3) Preparation of a Monomer Mixture

A monomer mixture was prepared by grinding the following components in a stainless ball mill for 20 hours, whereby a monomer mixture was prepared:

|  | Parts by Weight |
| --- | --- |
| Styrene monomer | 70 |
| n-Butylmethacrylate | 30 |
| Nigrosine | 2.4 |
| Low-molecular-weight polypropylene | 7.3 |

(4) Preparation of a Dispersion of the Monomer Mixture and the Magnetic Particles A mixture of the following components was dispersed, with stirring by ultrasonic wave for 2 hours to prepare a dispersion of the monomer mixture and the magnetic particles:

|  | Parts by Weight |
|---|---|
| The monomer mixture | 100 |
| The polystyrene-coated magnetic particles | 103 |
| Lauroyl peroxide | 6.1 |

(5) Preparation of a Suspension Containing the Magnetic Particles 400 parts by weight of a 3 wt. % aqueous solution of polyvinyl alcohol with a saponification degree of 88% and with a polymerization degree of 2400 was prepared.

To this aqueous solution of polyvinyl alcohol, there was added the above prepared dispersion of the monomer mixture and the magnetic particles. The mixture was then dispersed by the same Homo Mixer as that employed in Example 2 at 4,000 rpm to 5,000 rpm for 30 seconds, so that a suspension of divided liquid particles containing the magnetic particles therein was prepared. The particle size of the divided liquid particles was mostly in the range of 5 $\mu m$ to 20 $\mu m$.

(6) Polymerization of the Suspension

The above prepared suspension was placed in a flask equipped with a stirrer, a reflux condenser, a thermometer, and an inert gas leading tube, and was subjected to suspension polymerization with a small amount of an argon gas passed therethrough, with stirring at 100 rpm, at 70° C. for 8 hours.

To the thus obtained suspension, there was added 100 parts by weight of water. The mixture was stirred and the suspension was decanted. In this manner, the suspension was washed with water 3 times. Thereafter, the suspension was dried by air-drying and reduced pressure drying, whereby magnetic toner No. 3 was obtained with a yield of 95%.

The single figure shows the particle size of distribution of the thus obtained magnetic toner particles.

COMPARATIVE EXAMPLE 1

Example 2 was repeated except that the tri-iron tetroxide powder was not treated with the silane coupling agent, whereby a comparative magnetic toner No. 1 was prepared.

In this case, at the preparation of a suspension containing the magnetic particles, immediately after the aqueous solution of polyvinyl alcohol was added to the dispersion of the monomer mixture and the magnetic particles, the magnetic particles diffused into the aqueous solution of polyvinyl alcohol and the divided liquid particles containing the magnetic particles therein in the suspension were very unstable.

After the suspension polymerization reaction, the reaction mixture was passed through a sieve with 200 meshes. As a result, a number of lumps of a polymeric material remained on the sieve. Furthermore, it was found that a large quantity of the polymeric material adhered to the blades of the stirrer and the inside wall of the flask.

The yield of the magnetic toner particles was 53% and it was observed that the magnetic particles deposited on the surface of the particles. This toner was not suitable for practical use.

COMPARATIVE EXAMPLE 2

Example 2 was repeated except that the tri-iron tetroxide powder was not coated with the polymer before the suspension polymerization, whereby a comparative magnetic toner No. 2 was prepared.

In this case, when a dispersion of the magnetic particles and the monomer was suspended in the aqueous solution of polyvinyl alcohol, most of the magnetic particles stay within the divided liquid particles. However, many of the liquid particles with a diameter of 10 $\mu m$ or less were transparent and some of them collapsed during the inspection.

After the suspension polymerization, it was observed that lumps of a polymeric material adhered to the stirrer.

The yield of the magnetic toner particles was 77% and the color of the toner particles was greyish. This toner was not suitable for practical use.

COMPARATIVE EXAMPLE 3

Example 2 was repeated except that the tri-iron tetroxide powder was not treated with the silane coupling agent, but it was treated with a titanate-type coupling agent, KR-TTS (i-propoxy titanium-tri-i-stearate), by dissolving 2 parts by weight of the titanate-type coupling agent in 50 parts by weight of toluene, immersing the tri-iron tetroxide powder (Trade Mark: EPT-100 made by Toda Kogyo Corp.) in the mixture of the titanate-type coupling agent and toluene, and drying the mixture. Thus, a comparative magnetic toner No. 3 was prepared.

When the dispersion of the magnetic particles and the monomer mixture was suspended in the aqueous solution of polyvinyl alcohol, the magnetic particles were not dispersed well in the divided liquid particles with a diameter of about 5 $\mu m$ and some of them collapsed during the inspection.

After the suspension polymerization, it was observed that lumps of a polymeric material adhered to the stirrer and the obtained magnetic toner particles were greyish in color. The thus obtained toner was not suitable for practical use, either.

The magnetic toners No. 1, No. 2 and No. 3 obtained by use of the surface treatment method according to the present invention and the comparative magnetic toners No. 1, No. 2 and No. 3 were inspected with respect to (1) the specific inductive capacity, (2) the electric resistance of a pellet of each toner, (3) the quantity of electric charge, (4) the amount of the scale of the toner deposited in the apparatus for producing the toner, and (5) the volume mean diameter.

The specific inductive capacity and the electric resistance of each toner were measured by use of a transformer bridge with a frequency of 1 KHz with respect to a pellet of the toner moulded by applying a pressure of 6 ton/cm$^2$ thereto.

The quantity of electric charge was measured by a conventional blow-off method by mixing each toner with iron powder carriers.

The results are as follows:

| Properties | Specific Inductive Capacity | Pellet Resistance [Ω cm] | Quantity of Electric Charge [μc/gr] | Amount of Scale [wt. %] | Volume Mean Diameter [μm] |
|---|---|---|---|---|---|
| Example 1 | 4.9 | $3.0 \times 10^{10}$ | +11.5 | 2.2 | 10.9 |
| Example 2 | 4.6 | $3.2 \times 10^{10}$ | +14.6 | 1.0 | 10.2 |
| Example 3 | 4.7 | $2.7 \times 10^{10}$ | +12.4 | 1.5 | 12.0 |
| Comp. Example 1 | 10.8 | $7.9 \times 10^{8}$ | +0.9 | 42.3 | 21.5 |
| Comp. Example 2 | 7.4 | $3.6 \times 10^{9}$ | +1.8 | 19.0 | 13.0 |
| Comp. Example 3 | 6.6 | $5.8 \times 10^{9}$ | +3.6 | 14.0 | 11.2 |

As explained above, when the surface treatment method according to the present invention was employed, high quality magnetic toner particles with magnetic particles uniformly dispersed within each toner particle were obtained. Moreover, when producing the magnetic toner particles, the amount of the scale produced in the course of the production of the toner was small.

What is claimed is:

1. A surface treatment method for uncoated magnetic particles consisting of magnetic material comprising the steps of activating by heating said uncoated magnetic particles to a temperature of 100° C. to 500° C., treating the surfaces of said magnetic particles with a reactive silane coupling agent, mixing the silane-treated magnetic particles with at least one polymerizable vinyl monomer, polymerizing said monomer to form a polymer, and thereby coating the surfaces of said magnetic particles with said polymer.

2. A surface treatment method for magnetic particles as claimed in claim 1, wherein the treating of said magnetic particles with said reactive silane coupling agent is performed by the steps comprising (a) adding said silane coupling agent to an organic solvent, in an amount ranging from 0.1 wt. % to 5 wt. %, based on the weight of said magnetic particles, (b) adjusting the pH of said solution of said silane coupling agent and said organic solvent to a pH at which said silane coupling agent is hydrolyzed, (c) immersing said magnetic particles in said solution, and (d) recovering said magnetic particles.

3. A surface treatment method for magnetic particles as claimed in claim 2, wherein said recovered magnetic particles are further subjected to heat treatment at temperature ranging from 100° C. to 120° C.

4. A surface treatment method for magnetic particles as claimed in claim 1, wherein the coating of said magnetic particles with said polymer is performed by vapor-phase polymerization of said monomer in the presence of said magnetic particles.

5. A surface treatment method for magnetic particles as claimed in claim 1, wherein the coating of said magnetic particles with said polymer is performed by polymerizing said monomer in a solvent in the presence of said magnetic particles.

6. A surface treatment method for magnetic particles as claimed in claim 1, wherein the coating of said magnetic particles with said polymer is performed by bulk polymerization of said monomer in the presence of said magnetic particles.

7. A surface treatment method for magnetic particles as claimed in claim 1, wherein said reactive silane coupling agent is selected from the group consisting of:
γ-chloropropyltrimethoxysilane,
vinyltrichlorosilane,
vinyltriethoxysilane,
vinyltrimethoxysilane,
vinyl.tris(β-methoxyethoxy)silane,
γ-methacryloxypropyltrimethoxysilane,
β-3,4-epoxycyclohexyl)ethyltrimethoxysilane,
γ-glycidoxypropyltrimethoxysilane,
γ-mercaptopropyltrimethoxysilane,
γ-aminopropyltriethoxysilane,
N-β-(aminoethyl)-γ-aminopropyltrimethoxysilane, and
γ-ureidopropyltriethoxysilane.

8. A method for treating the surfaces of magnetic particles to improve their dispersibility and their surface affinity with respect to polymerizable monomers, which consists essentially of the steps of: heating magnetic particles to a temperature of from 100° to 500° C. effective to remove adsorbed water from said magnetic particles whereby to activate said magnetic particles, said magnetic particles having a particle size of from about 0.01 to about 1 micrometers and consisting of a magnetic material selected from the group consisting of magnetic metals, magnetic metal alloys, magnetic metal oxides and ferromagnetic materials; then coating said magnetic particles with from 0.1 to 5 wt. %, based on the weight of said magnetic particles, of a reactive silane coupling agent and heating same at 100° to 120° C. whereby to bond said silane coupling agent to the surfaces of said magnetic particles; then mixing said magnetic particles with a polymerizable vinyl monomer component which can be polymerized by radical polymerization and polymerizing said monomer component whereby to form a polymer coating on each of said magnetic particles, which coating is firmly bonded to its magnetic particle by said silane coupling agent.

* * * * *